3,135,716
PROCESS FOR PREPARING TERMINALLY REACTIVE POLYMERS
Carl A. Uraneck, James N. Short, and Robert P. Zelinski, all of Bartlesville, Okla., assignors to Phillips Petroleum Company, a corporation of Delaware
No Drawing. Filed Nov. 6, 1958, Ser. No. 772,167
26 Claims. (Cl. 260—45.5)

This invention relates to new and useful polymeric materials and process for their preparation. In one aspect the invention relates to terminally reactive polymers. In another aspect the invention relates to solid polymeric materials prepared by reacting terminally reactive polymeric materials. In still another aspect of the invention solid polymeric materials are prepared by reacting terminally reactive polymers with a polyfunctional organic compound. In yet another aspect of the invention solid polymeric materials are prepared by curing terminally reactive polymeric materials.

As used herein, the term "terminally reactive polymer" designates polymer which contains a reactive group at each end of the polymer chain. The term "monoterminally reactive polymer" designates polymer which contains a reactive group only at one end of the polymer chain.

As used herein the term "polyfunctional organic compounds" designates compounds which are capable of reacting with at least two reactive terminal groups.

It is an object of this invention to provide new and useful polymeric materials and process for their preparation.

Another object of this invention is to provide terminally reactive polymers having improved properties.

Still another object of this invention is to provide polymers having improved properties prepared by reacting terminally reactive polymeric materials.

It is another object of this invention to provide improved processes for the preparation of the foregoing polymeric materials.

These and other objects of the invention will become more readily apparent from the following detailed description and discussion.

The foregoing objects are realized broadly by preparing improved polymers containing terminal reactive groups.

In one aspect of the invention the terminally reactive polymers are converted through reaction of the reactive groups to solid polymers having improved properties.

In another aspect of the invention the terminally reactive polymers which are converted are liquid polymers.

In still another aspect of the invention the improved polymers are obtained by heating the terminally reactive polymer whereby curing of the polymer is effected.

In yet another aspect of the invention the terminally reactive polymer is compounded in a recipe with conventional curatives and heated.

In another aspect of the invention the new and useful solid polymers are prepared by reacting terminally reactive polymer with a polyfunctional, organic compound.

In yet another aspect of the invention reaction of the terminally reactive polymer with the polyfunctional compound is carried out in the presence of a conventional curing system.

It has now been discovered that new and useful polymers can be prepared by polymerizing polymerizable monomers to liquid or semi-solid polymers which contain reactive groups at the ends of the polymer chain and double bonds within the polymer chain. It has also been discovered that new and useful solid polymers can be obtained by reacting and/or curing the terminally reactive polymers.

The monomers which can be employed in the preparation of the terminally reactive polymers include a wide variety of materials. The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substitutents along the chain can also be employed, such as for example, halogenated dienes, such as chloroprene, fluoroprene, etc. Of the conjugated dienes the preferred material is butadiene, with isoprene and piperylene also being especially suitable. In addition to the conjugated dienes other monomers which can be employed are aryl-substituted olefins, such as styrene, various alkyl styrenes, paramethoxystyrene, vinylnaphthalene, vinyltoluene, and the like; heterocyclic nitrogen-containing monomers, such as pyridine and quinoline derivatives containing at least 1 vinyl or alphamethylvinyl group, such as 2-vinylpyridine, 3-vinylpyridine, 4-vinylpyridine, 3-ethyl-5-vinylpyridine, 3-methyl-5-vinylpyridine, 3,5-diethyl-4-vinylpyridine, etc.; similar mono- and di-substituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The terminally reactive polymers in addition to including homopolymers and copolymers of the above materials also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth. A detailed description of block copolymers containing terminal reactive groups and their method of preparation is set forth in the copending application of R. P. Zelinski, Serial No. 737,213, filed May 23, 1958, now abandoned.

The terminally reactive polymers are prepared by contacting the monomer or monomers which it is desired to polymerize with an organo polyalkali metal compound. The organo polyalkali metal compounds preferably contain from 2 to 4 alkali metal atoms, and those containing 2 alkali metal atoms are more often employed. As will be explained hereinafter, lithium is the preferred alkali metal.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incorporated in the polymer chain and the alkali metal being attached terminally at each end of the polymer chain. The polymers in general will be linear polymers having two ends; however, polymers containing more than two ends can be prepared within the scope of the invention. The general reaction can be illustrated graphically as follows:

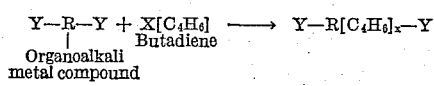

or

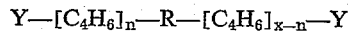

or combinations thereof.

A specific example is:

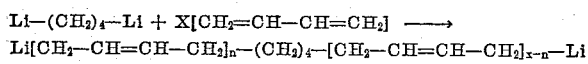

In the specific example 1,4-addition of butadiene is shown; however, it should be understood that 1,2-addition can also occur. In this description, identification of the lithium atoms in the polymer as being terminally positioned is based upon the above reaction which has been found to provide highly reactive polymers in a predominantly hydrocarbon diluent.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is polymer having alkali metal at only one end of the chain is substantially higher. The alkali metals, of course, include sodium, potassium, lithium, rubidium, and cesium. The organic radical of the organo polyalkali metal compound can be an aliphatic, cycloaliphatic or aromatic radical. For example, di- and polyalkali metal substituted hydrocarbons can be employed including 1,4-dilithiobutane, 1,5-dipotassiopentane, 1,4-disodio-2-methylbutane, 1,6-dilithiohexane, 1,10-dilithiodecane, 1,15-dipotassiopentadecane, 1,20-dilithioeicosane, 1,4-disodio-2-butene, 1,4-dilithio-2-methyl-2-butene, 1,4-dilithio-2-butene, 1,4-dipotassio-2-butene, dilithionaphthalene, disodionaphthalene, 4,4'-dilithiobiphenyl, disodiophenanthrene, dilithioanthracene, 1,2-dilithio-1,1-diphenylethane, 1,2-disodio-1,2,3-triphenylpropane, 1,2-dilithio-1,2-diphenylethane, 1,2-dipotassiotriphenylethane, 1,2-dilithiotetraphenylethane, 1,2-dilithio-1-phenyl-1-naphthylethane, 1,2-dilithio-1,2-dinaphthylethane, 1,2-disodio-1,1-diphenyl-2-naphthylethane, 1,2-dilithiotrinaphthylethane, 1,4-dilithiocyclohexane, 2,4-disodioethylcyclohexane, 3,5-dipotassio-n-butylcyclohexane, 1,3,5-trilithiocyclohexane, 1-lithio-4-(2-lithiomethylphenyl)butane, 1,2-dipotassio-3-phenylpropane, 1,2-di(lithiobutyl)benzene, 1,3-dilithio-4-ethylbenzene, 1,4-dirubidiobutane, 1,8-dicesio-octane, 1,5,12-trilithiododecane, 1,4,7-trisodioheptane, 1,4-di(1,2-dilithio-2-phenylethyl)benzene, 1,2,7,8-tetrasodionaphthalene, 1,4,7,10-tetrapotassiodecane, 1,5-dilithio-3-pentyne, 1,8-disodio-5-octyne, 1,7-dipotassio-4-heptyne, 1,10-dicesio-4-decyne, and 1,11-dirubidio-5-hendecyne, 1,2-disodio-1,2-diphenylethane, dilithiophenanthrene, 1,2-dilithiotriphenylethane, 1,2-disodio-1,2-diphenylethane, dilithiomethane, 1,4-dilithio-1,1,4,4-tetraphenylbutane, 1,4-dilithio-1,4-diphenyl-1,4-dinaphthylbutane, and the like. The initiator can thus be represented by the formula $RX_n$ wherein X is an alkali metal, $n$ is an integer of 2 to 4 and R is an aliphatic, cycloaliphatic or aromatic hydrocarbon radical.

While the organo dialkali metal initiators in general can be employed, certain specific initiators give better results than others and are preferred in carrying out the preparation of the terminally reactive polymers. For example, of the condensed ring aromatic compounds the lithium-naphthalene adduct is preferred, but the adducts of lithium with anthracene and biphenyl can be employed with good results. Of the compounds of alkali metals with polyaryl-substituted ethylenes, the preferred material is 1,2-dilithio-1,2-diphenylethane (lithium-stilbene adduct). One reason why certain of the organo dialkali metals are more effective than others lies in the difficulty of preparing the pure organo dialkali metal compounds. In many instances the compounds which are formed are mixtures of mono-and dialkali metal compounds, which are less effective in promoting the formation of the terminally reactive polymers. The organo dialkali metal compounds which have been set forth as being preferred, are those which when prepared contain a minimum of the monoalkali metal compound.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. When the terminally reactive polymers are subjected to curing or reaction with polyfunctional compounds, materials of still higher molecular weight are obtained. Usually the initiator is used in amounts between about 0.25 and about 100 millimoles per 100 grams of monomer.

Formation of the terminally reactive polymers is generally carried out in the range of between −100 and +150° C., preferably between −75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

The terminally reactive polymer prepared in accordance with the processes of this invention contain an alkali metal atom on each end of the polymer chain and the organic radical of the initiator is present in the polymer chain. These terminally reactive polymers can be treated with reagents to introduce various reactive groups in place of the alkali metal atoms. The following equations represent examples of specific methods which can be employed to introduce reactive groups. In these equations, P designates a polymer chain.

(1) Li—P—Li+2S→Li—S—P—S—Li
Li—S—P—S—Li+2H₂O→HS—P—SH+2LiOH
(2) Li—P—Li+2Cl₂→Cl—P—Cl+2LiCl

The polymers containing other reactive groups, and in addition polymers with the terminal alkali metal atoms, can be further treated to form solid polymers having many desirable properties. In one method the terminally reactive polymer, for example, a terminally reactive liquid polymer a butadiene, is subjected to heat whereby the terminal reactive groups effect cross-linking of the polymer molecules and the polymer is converted to a solid, rubbery material.

The reactive groups, which when present on each end of the polymer chain provide means for curing by heat alone as described above, are in general groups which contain sulfur, oxygen or nitrogen, such as:

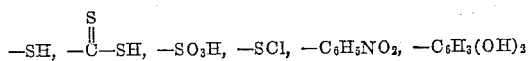

and the like. These groups, which can be defined as "self curing," can be placed on the ends of the polymer chain by reaction with suitable reactants. The two following equations demonstrate how such groups can be placed on the ends of the polymer chain. In the following equations, P designates a polymer chain.

(1) Li—P—Li+2S→Li—S—P—S—Li
Li—S—P—S—Li+2H₂O→H—S—P—SH+2LiOH
(2) Li—P—Li+2SO₂Cl₂→
Cl—SO₂—P—SO₂—Cl+2LiCl
Cl—SO₂—P—SO₂—Cl+2H₂O→
HO₃S—P—SO₃H+2HCl

Other reactants which can be employed in a like manner to replace the alkali metal atoms with reactive groups are: carbon disulfide, sulfur dioxide, disodiumchloroesorcinate, and the like. The lithium-containing polymer can also be reacted with chloronitrobenzene.

The polymers containing the terminal reactive sulfur, oxygen and nitrogen-containing groups set forth above are converted to solid polymers by heating at temperatures in the range of between about 100 and about 500° F. and preferably between about 200 and about 350° F. More usually, the heating is continued for a period of between about 2 minutes and about 24 hours, the particular time employed depending on the polymers being treated and the reactive groups which are terminally attached to the polymers. The reactions which take place in the formation of the solid polymers are typified by the following specific example:

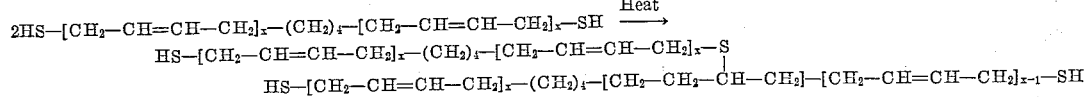

Conversion of the polymers containing terminal reactive groups, as set forth above, to solid polymers can also be effected by carrying out the heating in the presence of a conventional curing agent or in the presence of a conventional curing system. Various curing agents can be employed for this purpose, depending on the polymers which are being treated, including peroxides such as benzoyl peroxide and dicumyl peroxide, ultraviolet and ionizing radiation, and systems employing sulfur in conjunction with other agents, including vulcanization accelerators such as tetramethylthiuram disulfide, benzothiazyl disulfide, mercaptobenzothiazole, thiocarbanilide, N-cyclohexyl-2-benzothiazylsulfenamide and N,N-dimethy-S-tert-butylsulfenyl dithiocarbamate, and including such accelerator activators as magnesium or zinc oxide in conjunction with fatty acids, zinc stearate, magnesium stearate, and the like.

In another method of this invention, terminal reactive groups other than the self-curing sulfur, nitrogen and oxygen-containing groups listed hereinbefore are placed on the ends of the polymer chain, and the thus produced terminally reactive polymers are coupled by means of polyfunctional reactants, more usually difunctional reactants.

Some examples of reactive groups which can be placed on the ends of the polymer chains by reaction of a suitable compound with the terminal alkali metal atoms are

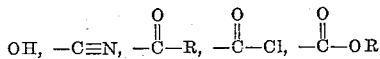

halogen, and the like, wherein R can be hydrogen or an aliphatic, cycloaliphatic or aromatic radical.

The following equations demonstrate typical methods for replacing the alkali metal atoms with a reactive group. In these equations, P designates the polymer chain.

(1)    Li—P—Li + O₂ ⟶ Li—O—P—O—Li
Li—O—P—O—Li $\xrightarrow{H_2SO_4}$ H—O—P—O—H + Li₂SO₄

(2) 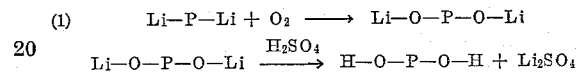
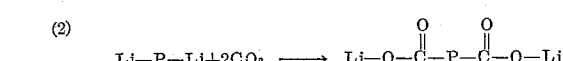
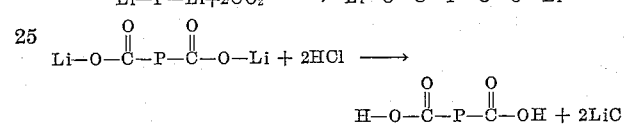

(3) Li—P—Li + 2Cl—C≡N ⟶ N≡C—P—C≡N + 2LiCl (4) 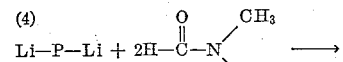
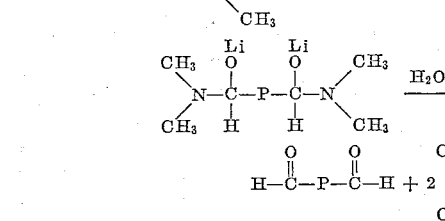
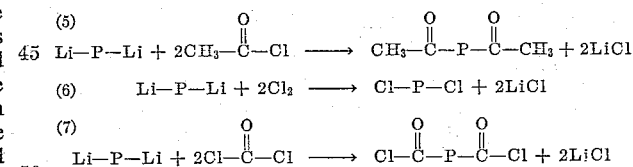

(5)  Li—P—Li + 2CH₃—C(O)—Cl ⟶ CH₃—C(O)—P—C(O)—CH₃ + 2LiCl (6)    Li—P—Li + 2Cl₂ ⟶ Cl—P—Cl + 2LiCl (7)  Li—P—Li + 2Cl—C(O)—Cl ⟶ Cl—C(O)—P—C(O)—Cl + 2LiCl

Some examples of reagents which can be employed to displace the terminal alkali metal atoms and place the aforedescribed and other reactive groups on the ends of the polymer chain are acetone, methyl ethyl ketone, phenyl methyl ketone, benzyl ethyl ketone, p-tolyl n-propyl ketone, acetyl chloride, propionyl chloride, butyryl bromide, benzoyl chloride, α-cyclohexylacetyl chloride, ethyl acetate, methyl propionate, cyclohexyl butyrate, ethyl benzoate, phenyl acetate, p-tolyl propionate, 2-butenyl acetate, dimethyl formamide, dimethyl acetamide, diethyl benzamide, diphenyl formamide, diethyl 3-cyclohexylpropionamide, methyl chloromethyl ketone, propyl bromoethyl ketone, phenyl chlorophenyl ketone, cyclohexyl bromopropyl ketone, acetonitrile, propionitrile, butyronitrile, 2-cyclohexylacetonitrile, benzonitrile, p-methylbenzonitrile, ethyl isocyanide, n-butyl isocyanide, n-decyl isocyanide, 2-(4-methylcyclohexy)ethyl isocyanide, methyl isocyanate, propyl isocyanate, phenyl isocyanate, benzyl isocyanate, p-tolyl isocyanate, n-pentyl isothiocyanate, 2-hexyl isothiocyanate, butenyl isothiocyanate, xylyl isothiocyanate, benzoquinone, 2-methylbenzoquinone, 4-bromocyclohexanone, ketene, ethylketene, phenylketene, cyclohexylketene, and the like.

As will be shown hereinafter, coupling agents can be used to tie polymer chains together by effecting reaction between the coupling agent and the terminal reactive groups. In some cases, compounds listed above as reagents for substituting other terminal reactive groups for the alkali metal atoms can also serve as coupling agents. For example, $COCl_2$ can act as a coupling agent as shown in the following equation:

(8)

If it is desired to utilize this reagent in the manner shown in Equation 7, it is necessary to use an amount in excess of the stoichiometric. If coupling as shown in Equation 8 is desired, smaller amounts of the reagent are employed.

Some of the reagents which can be utilized to replace the terminal alkali metal atoms with other reactive groups serve to place reactive groups on the polymer chain ends which contain more than one functional group. As shown in Equation 4, step 2, above, the use of dimethylformamide to provide terminal aldehyde groups proceeds through a hydrolysis step. This hydrolysis step can also serve to remove only the lithium (or other alkali metals) atoms and thus provide a terminal group containing both a hydroxyl and a tertiary amine group.

The reagents shown above serve to replace terminal alkali metal atoms with other desired reactive groups in essentially one step. In most of the reactions, hydrolysis or a similar step supplying H+ ions is required to finally displace the alkali metal. The present invention is not to be construed as being so limited since the reactive groups resulting from such reactions can be further converted to other desired functions by one, two or more steps. Such known reactions as oxidation, reduction, esterification, and the like can be employed in such a method of operation.

In accordance with another aspect of this invention, the polymers containing either terminal alkali metal atoms such as lithium atoms, or the polymers containing other terminal reactive groups as hereinbefore described are coupled by means of organic polyfunctional coupling agents. The preferred polymers of this invention are prepared by means of dialkali metal organo compounds, the resulting polymers containing two terminal reactive groups; therefore, the preferred polyfunctional coupling agents are those containing two functional groups. In general, polyfunctional alcohols, acids, halides, amines, ketones, diisocyanates and the like are employed. The organic radicals of the organic polyfunctional compounds are preferably selected broadly from aliphatic cycloaliphatic and aromatic hydrocarbon radicals. The reaction with polyfunctional compounds can be illustrated by the following specific example:

dichlorocyclohexane 1,4-dichloronaphthalene, ethylenediamine, pentamethylenediamine, 1,8-diamino-3-octene, 1,4-diaminobenzene, 1,3-diamino-cyclohexane, 4-aminobenzylamine, 1,4-diaminonaphthalene, 4-(aminoethyl)aniline, hydroquinone, 1,4-bis(acetyl)butane, 1,5-bis(propionyl)-pentane, 1,4-bis(acetyl)cyclohexane, alpha,alpha'-bis(acetyl)xylene, butane-1,4-diisocyanate, octane-1,8-diisocyanate, cyclohexane-1,4-diisocyanate, benzene-1,4-diisocyanate, butane-1,4-disulfonic acid, hexane-1,6-disulfonic acid, decane-1,10-disulfonic acid, cyclohexane - 1,4 - disulfonic acid, benzene-1,4-disulfonic acid, 1,4-di(sulfoethyl)-benzene, 2-(3-sulfophenyl)propane sulfonic acid, aliphatic diepoxide resin, and the like. The polyfunctional organic coupling agents can thus be represented by the formula $RY_x$ wherein R is an aliphatic, cycloaliphatic or aromatic radical, $x$ is at least 2 and Y is a functional group capable of reacting with the terminal reactive group of the polymer and which characterizes the polyfunctional organic coupling agent as an alcohol, acid, acid anhydride, halide, amine, ketone, isocyanate or an epoxy compound.

In addition to the foregoing it is within the scope of the invention to react the terminally reactive polymer with a like or unlike terminally reactive polymer having different reactive groups, as typified by the following specific reaction:

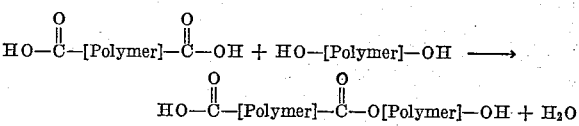

Reaction of the terminally reactive polymer with the polyfunctional compounds can be carried out over a range of temperatures generally between about −100 and about +350° F. and more usually between about 0 and about 250° F. The time employed in carrying out the reaction will vary, depending on the particular materials being reacted and is usually less than 2 hours. The quantity of bifunctional reactant employed in carrying out the reaction is usually between about 0.5/1 to 5/1 equivalents based on the original initiator charge. The reaction mechanism is somewhat similar to that previously described in that the functional or reactive groups of the bifunctional reactant can react with the reactive groups at the ends of the chains of the terminally reactive polymers and with double bonds of either the same molecule or other molecules of the polymer. The products which result from the reaction of the polyfunctional compound and the terminally reactive polymer can be subjected to a further treatment in the presence of conventional curing agents or curing systems. The curing agents and systems which can be employed, in general, are those which were set forth in the preceding discussion.

It is, of course, within the scope of the invention in the

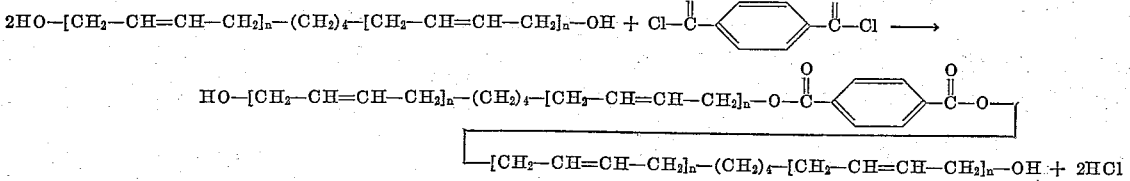

Examples of specific coupling agents which can be employed are: ethylene glycol, propylene glycol, decylene glycol, dihydroxybenzene, dihydroxycyclohexane, 1,4-di(hydroxyethyl)benzene, glycerol, 1,2,3-trihydroxybutane, erythritol, mannitol, aminophenol, pyrocatechol, resorcinol, pyrogallol, oxalic acid, malonic acid, succinic acid, adipic acid, sebacic acid, phthalic acid (o m and p), cyclohexane dicarboxylic acid, pyridine dicarboxylic acid, naphthalic acid, fumaric acid, the anhydrides of the above listed acids, methylene chloride, 1,2-dibromoethane, 1,4-dichlorobutane dibromobenzene, 4-bromobenzyl bromide, preparation of any of the solid polymers thereof to employ conventional compounding agents such as fillers, pigments, reinforcing agents, plasticizers, and the like.

The terminally reactive polymers of this invention are characterized by their high molecular weights and also by wide range of molecular weight which can be obtained. As previously pointed out, these polymers can be prepared with molecular weights ranging from 1000 to as high as 150,000 or higher. The polymers, which are usually liquids or semi-solids, but can also be solids, find various uses, a major use being in the preparation of the solid polymers of this invention, i.e., by the reaction of the polymers with polyfunctional compounds, heating, curing, etc. The polymers also find use as binders, for example, in the preparation of castable solid materials. The solid polymers of this invention vary widely in their properties depending on the particular monomers and mixtures of monomers utilized in their preparation. Many of the polymers are tough, rubbery materials, others are plastic in nature and others are highly elastic. Depending on their particular properties, they find wide applications in the preparation of molded articles, such as tires and other rubber articles; in some instances they can be extruded, calendered, and otherwise treated as conventional plastics.

Particular advantages are realized in the preparation of the solid polymers. Since the polymers are usually liquid or semi-solid up to the final treatment they are readily handled, can be easily combined with additives, such as fillers, curing agents, etc., and can be readily molded, without the use of high pressures, in all types and sizes and in both regular and irregular shapes.

The following examples are presented in illustration of the invention.

EXAMPLES

A series of polymerization initiators was prepared by reacting lithium or sodium with 1,4-dichlorobutane, cis- and trans-stilbene (1,2-diphenylethylene), naphthalene, and biphenyl. Initiators from 1,4-dichlorobutane were prepared by adding a solution of the halogen compound to the alkali metal in the form of wire or as a dispersion in a suitable solvent such as diethyl ether. Temperatures for this reaction ranged from −30 to 20° C. The reaction was effected in a nitrogen atmosphere.

Initiators using hydrocarbon starting materials were prepared by the direct addition of lithium or sodium wire to the hydrocarbon in the solvents hereinafter designated. All materials can be charged simultaneously in reactions of this type. Reaction temperatures for these runs ranged from 25 to 40° C. Table I shows the various initiators which were prepared.

The general polymerization procedure comprised charging the dry solvent to the reactor, passing prepurified nitrogen through it to exclude air, and then adding the initiator and monomer. Polymerization temperatures ranged from −28 to 50° C. Table II gives details of the various polymerization runs.

Unquenched polymer solutions were treated with sulfur, oxygen, or carbon dioxide. Treatment involved replacement of the alkali metal substituents on the polymer chains by active end groups. The several types of treatment and the results obtained are set forth in Table III. Runs 1 and 2 of Table III show treatment with sulfur. After polymerization in a series of runs was complete, 10 milliliters of a 50 volume percent aqueous solution of acetic acid was added to each reaction mixture. Variable amounts of a solution of elemental sulfur in dry benzene were added to three polymerization bottles (Run 1). The systems were agitated for 12 hours at 50° C. Addition of sulfur caused the reaction mixtures to set up immediately. The polymers were carefully isolated and the excess sulfur was removed by heating the products with an aqueous solution of sodium carbonate. Sulfur was used as a slurry in toluene for treating the polymer in Run 2, Table III. Otherwise the procedure was the same as that for Run 1.

Runs 3 and 4 of Table III show treatment of the unquenched polymer solutions with oxygen. Oxygen was injected into each reaction mixture at room temperature. The material was then acidified with HCl and the organic layer washed with water. The polymeric product was separated by coagulation with isopropanol.

Treatment with carbon dioxide shown in Runs 5 through 35 of Table III was effected either by pouring the unquenched polymer solution onto Dry Ice or by injecting carbon dioxide gas and polymer solution under pressure into separate arms of a T-tube which provided a means for bringing the gas into contact with the polymer. Run 6 is the only run in which carbon dioxide gas was used. Following treatment by either method, acid was added and the organic layer was washed with water. The polymer was recovered either by evaporation of the solvent or by coagulation with isopropanol. Acetic acid was used to acidify the reaction mixture in Run 5. Hydrochloric acid was used in the remaining runs. The polymer from Runs 5, 6 and 13 was recovered by coagulation with isopropanol. The solvent was evaporated in the other runs.

Table IV shows coupling and/or curing of polymers from Tables II and III with the aid of heat and/or the addition of various reagents.

The polybutadiene containing carboxy end groups from Run 20 (see Tables II and III), and polybutadiene rubber which had an inherent viscosity of 1.51 (used as a control), were compounded in accordance with the following formulation:

| | Parts by weight |
|---|---|
| Rubber | 100 |
| High abrasion furnace black (Philblack 0) | 50 |
| Zinc oxide | 3 |
| Stearic acid | 2 |
| Flexamine [1] | 1 |
| Resin 731 [2] | 3 |
| Santocure [3] | 1 |
| Sulfur | 1.1, 1.3, 1.5, 1.7 |
| Tolylene-2,4-diisocyanatediphenylamine adduct | 3 |

[1] Physical mixture containing 65 percent of a complex diarylamine-ketone reaction product and 35 percent of N,N′-diphenyl-p-phenylenediamine.
[2] Disproportionated rosin acid.
[3] N-cyclohexyl-2-benzothiazylsulfenamide.

The polybutadiene rubber used as a control was prepared by the polymerization of 1,3-butadiene in cyclohexane using 1,2-dilithio-1,2-diphenylethane as the initiator. The quantity of initiator used was 1.9 millimoles per 100 grams monomer. Polymerization temperature was 50° C. and 95.5 percent conversion was reached in 1.5 hours.

The polybutadiene rubber and the carboxy-containing polybutadiene rubber were compounded on a roll mill using variable sulfur loadings as indicated. The compounded stocks were cured 30 minutes at 307° F. and swelling, resilience, and heat build-up data were obtained. Results were as follows:

| | Sulfur level, parts | | | |
|---|---|---|---|---|
| | 1.1 | 1.3 | 1.5 | 1.7 |
| Carboxy-containing polybutadiene: | | | | |
| $V_r$ (in n-heptane)[1] | 0.276 | 0.301 | 0.328 | 0.347 |
| Resilience, percent | 65.6 | 68.6 | 70.3 | 73.4 |
| $\Delta T$, ° F | 85.3 | 70.6 | 64.5 | 55.8 |
| Polybutadiene (control): | | | | |
| $V_r$ (in n-heptane)[1] | [2] | 0.254 | 0.273 | 0.295 |
| Resilience, percent | [2] | 54.9 | 57.7 | 58.6 |
| $\Delta T$, ° F | [2] | 127.8 | 103.9 | 93.8 |

[1] Swell; $V_r$ = volume fraction of polymer in swollen gel.
[2] Stock undercured; stuck to mold.

Comparisons made at similar $V_r$ values show that the carboxy-containing polybutadiene has higher resilience and lower heat build-up than the polybutadiene control. These polymers can be used in the fabrication of tires, gaskets, tubing, insulation, foamed products, etc.

Table I

PREPARATION OF POLYMERIZATION INITIATORS

| Run No. | Organic starting material Type | Organic starting material Moles | Alkali metal | Moles | Solvents Type | Solvents Ml. | Temp., °C. | Time, hrs. | Remarks |
|---|---|---|---|---|---|---|---|---|---|
| 1 | 1,4-dichlorobutane | 0.1 | Li | 0.81 | Diethyl ether | 400 | 15 to 20 | 10 | 80% yield of 1,4-dilithiobutane (calculated from total alkalinity). |
| 2 | do | 0.10 | Li | 0.5 | do | 350 | −10 to −30 | | 63% yield of 1,4-dilithiobutane. |
| 3 | do | 0.10 | Li | 0.5 | do | 350 | −10 to 15 | | 62% yield of 1,4-dilithiobutane. |
| 4 | trans-Stilbene | 0.1 | Li | 0.2 | do Tetrahydrofuran | 550 50 | 40 | 1 | 100% yield of 1,2-dilithio-1,2-diphenylethane. |
| 5 | do | 0.1 | Li | 0.5 | Diethyl ether Tetrahydrofuran | 550 50 | 36 | 1 | Do. |
| 6 | do | 0.2 | Li | 1 | Diethyl ether Tetrahydrofuran | 1,100 100 | 36 | 2 | Do. |
| 7 | do | 0.3 | Li | 1.5 | Diethyl ether Tetrahydrofuran | 1,650 150 | 36 | 5 | Do. |
| 8 | do | 0.3 | Li | 1.5 | Diethyl ether Tetrahydrofuran | 1,390 126 | 36 | 1.25 | Do. |
| 9 | do | 0.03 | Na | 0.12 | Diethyl ether Tetrahydrofuran | 200 50 | 36 | 2.5 | 83% yield of 1,2-disodio-1,2-diphenylethane. |
| 10 | cis-Stilbene | 0.08 | Li | 0.4 | Diethyl ether Tetrahydrofuran | 550 50 | 36 | 2.5 | 85% yield of 1,2-dilithio-1,2-diphenylethane. |
| 11 | Naphthalene | 0.05 | Li | 0.20 | do | 170 | 36 | ¾ | 100% yield of Li-napthalene adduct (brown). |
| 12 | do | 0.05 | Li | 0.20 | do | 133 | 25 | 1 | Do. |
| 13 | do | 0.05 | Na | 0.20 | do | 133 | 25 | 5 | 100% yield of Na-naphthalene complex (bright green). |
| 14 | Biphenyl | 0.05 | Li | 0.20 | Diethyl ether Tetrahydrofuran | 150 50 | 36 | 1.5 | 100% yield of Li-biphenyl adduct (blue solution). |

Table II

PREPARATION OF POLYMERS CONTAINING ALKALI METALS AT ENDS OF POLYMER CHAINS

| Run No. | Monomer Type | Monomer Grams | Solvent Type | Solvent Grams | Initiator From Table I | Initiator Type | Amount charged, mmoles | Temp., °C. | Time, hrs. | Conv, percent | Approx. mol. wt. | Remarks |
|---|---|---|---|---|---|---|---|---|---|---|---|---|
| 1 | 1,3-butadiene | 100 | Cyclohexane | 780 | 1 | 1,4-dilithiobutane | 20 | 50 | 8.5 | 100 | 7,600 | Liquid polymer; initiator charged as solution in diethyl ether; 50% aq. acetic acid soln. added at end of polym.; inh. visc. 0.28. |
| 2 | do | 100 | do | 390 | 1 | do | 20 | 50 | 24 | 100 | 10,400 | Procedure same as 1; liquid polymer; inh. visc. 0.34. |
| 3 | do | 100 | do | 780 | 2 | do | 10 | 50 | 2.5 | 100 | 16,000 | Viscous liquid polymer; colorless; inh. visc. 0.45; gel free. |
| 4 | do | 100 | do | 390 | 3 | do | 30 | 50 | 3 | 100 | 11,000 | Liquid polymer: colorless. |
| 5 | do | 100 | Toluene | 864 | 2 | do | 5 | 50 | 2.5 | 100 | | Viscous liquid polymer; colorless. |
| 6 | do | 100 | Cyclohexane | 780 | 4 | 1,2-dilithio-1,2-diphenylethane | 50 | 50 | 1 | 100 | 3,000 | Liquid polymer; colorless. |
| 7 | do | 100 | do | 780 | 5 | do | 5 | 50 | 16 | 100 | 19,000 | Liquid polymer; colorless; inh. viscosity 0.49. |
| 8 | do | 100 | do | 780 | 5 | do | 10 | 50 | 16 | 100 | 8,100 | Liquid polymer; colorless; inh. viscosity 0.29. |
| 9 | do | 100 | do | 780 | 5 | do | 20 | 50 | 4 | 100 | 6,000 | Liquid polymer; colorless; inh. viscosity 0.23. |
| 10 | do | 100 | do | 780 | 5 | do | 30 | 50 | 4 | 100 | 3,000 | Liquid polymer, colorless; inh. viscosity 0.17. |
| 11 | do | 100 | n-Heptane | 684 | 6 | do | 5 | 30 | 4 | 100 | 20,000 | Viscous liquid polymer; colorless; inh. viscosity 0.52. |
| 12 | do | 100 | Cyclohexane | 780 | 7 | do | 20 | 5 | 4 | 100 | 4,000 | Liquid polymer; colorless; inh. visc. 0.20. |
| 13 | do | 100 | do | 585 | 7 | do | 3.5 | 50 | 1 | 100 | 72,000 | Rubbery polymer; clear; colorless; inh. visc. 1.15. |
| 14 | do | 100 | do | 780 | 5 | do | 20 | 30 | 4 | | 3,000 | Liquid polymer; colorless; inh. visc. 0.16. |
| 15 | do | 100 | do | 780 | 5 | do | 30 | 30 | 4 | | 2,500 | Liquid polymer; colorless; inh. visc. 0.13. |
| 16 | do | 100 | do | 780 | 5 | do | 20 | 5 | 4 | | 3,000 | Liquid polymer; colorless; inh. visc. 0.15. |
| 17 | do | 100 | do | 780 | 5 | do | 30 | 5 | 4 | | 2,500 | Liquid polymer; colorless; inh. visc. 0.11. |
| 18 | do | 100 | n-Heptane | 684 | 8 | do | 30 | −28 | 18 | 100 | 5,100 | Liquid polymer; colorless; inh. visc. 0.22. |
| 19 | do | 100 | do | 684 | 9 | 1,2-disodio-1,2-diphenylethane | 30 | −28 | 18 | 100 | 15,000 | Liquid polymer; colorless; inh. visc. 0.42. |
| 20 | do | 100 | Cyclohexane | 1,950 | 5 | 1,2-dilithio-1,2-diphenylethane | 2.5 | 50 | ¾ | 100 | 150,000 | Solid polymer; clear and colorless; inh. visc. 1.73. |
| 21 | do | 100 | do | 780 | 10 | do | 10 | 5 | 4 | 100 | 12,000 | Liquid polymer; colorless; inh. visc. 0.38. |
| 22 | do | 100 | do | 780 | 10 | do | 30 | 5 | 4 | 100 | 4,000 | Liquid polymer; colorless; inh. visc. 0.19. |

*Table II*—Continued

PREPARATION OF POLYMERS CONTAINING ALKALI METALS AT ENDS OF POLYMER CHAINS

| Run No. | Monomer Type | Monomer Grams | Solvent Type | Solvent Grams | Initiator From Table I | Initiator Type | Amount charged, mmoles | Temp., °C. | Time, hrs. | Conv., percent | Approx. mol. wt. | Remarks |
|---|---|---|---|---|---|---|---|---|---|---|---|---|
| 23 | 1,3-butadiene | 100 | Cyclohexane | 780 | 11 | Li-naphthalene adduct | 10 | 50 | 1 | 100 | 12,000 | Liquid polymer; colorless; inh. visc. 0.40. |
| 24 | ---do--- | 100 | ---do--- | 780 | 11 | ---do--- | 20 | 50 | 1 | 100 | 5,200 | Liquid polymer; colorless; inh. visc. 0.23. |
| 25 | ---do--- | 100 | ---do--- | 780 | 12 | ---do--- | 10 | 5 | 4 | 100 | 11,000 | Liquid polymer; colorless; inh. visc. 0.36. |
| 26 | ---do--- | 100 | ---do--- | 780 | 12 | ---do--- | 20 | 5 | 4 | 100 | 7,000 | Liquid polymer; colorless; inh. visc. 0.26. |
| 27 | Styrene | 100 | ---do--- | 780 | 12 | ---do--- | 10 | 5 | 4 | 100 |  | Solid polymer; white; inh. visc. 0.23. |
| 28 | ---do--- | 100 | ---do--- | 780 | 12 | ---do--- | 20 | 5 | 4 | 100 |  | Solid polymer; white; inh. visc. 0.14. |
| 29 | 1,3-butadiene | 100 | ---do--- | 780 | 13 | Na-naphthalene complex | 10 | 5 | 4 | 100 | 16,000 | Liquid polymer; colorless; inh. visc. 0.44. |
| 30 | ---do--- | 100 | ---do--- | 780 | 13 | ---do--- | 20 | 5 | 4 | 100 | 9,000 | Liquid polymer; colorless; inh. visc. 0.31. |
| 31 | Styrene | 100 | ---do--- | 780 | 13 | ---do--- | 10 | 5 | 4 | 100 |  | Liquid polymer; colorless; inh. visc. 0.24. |
| 32 | ---do--- | 100 | ---do--- | 780 | 13 | ---do--- | 20 | 5 | 4 | 100 |  | Liquid polymer; colorless; inh. visc. 0.20. |
| 33 | 1,3-butadiene | 100 | Tetrahydrofuran | 880 | 13 | ---do--- | 30 | -28 | 2.5 | 100 | 5,000 | Liquid polymer; colorless; inh. visc. 0.22. |
| 34 | ---do--- | 100 | Cyclohexane | 780 | 14 | Li-biphenyl adduct | 10 | 30 | 2 | 100 | 6,000 | Liquid polymer; colorless; inh. visc. 0.25. |
| 35 | ---do--- | 100 | ---do--- | 780 | 14 | ---do--- | 20 | 30 | 2 | 100 | 4,000 | Liquid polymer; colorless; inh. visc. 0.18. |

*Table III*

TREATMENT OF POLYMERS CONTAINING ALKALI METALS AT ENDS OF POLYMER CHAINS

| Run No. | Polymer from Table II | Treatment | Terminal group added | Inh. visc. | Approx. mol. wt. | Percent of group added | Gel, percent | Remarks |
|---|---|---|---|---|---|---|---|---|
| 1 | 1 | Sulfur (mmoles/mole initiator): a. 4 | SH | 0.67 | 31,000 |  | 0 | Mixtures set up immediately after addition of sulfur. |
|  |  | b. 6 | SH | 0.78 | 39,600 |  | 0 |  |
|  |  | c. 8 | SH | 0.75 | 37,200 |  | 0 |  |
| 2 | 2 | Sulfur (8 mmoles/mole initiator) | SH | 0.58 | 24,600 |  | 0 | Mixture set up immediately after addition of sulfur. |
| 3 | 5 | $O_2$ | OH, OOH |  |  |  |  | Polymer changed to sticky solid when solution exposed to air; solid dissolved upon addition of HCl. |
| 4 | 23 | $O_2$ | OH, OOH | 0.80 | 41,000 |  | 0 | Coupling reaction indicated by inherent viscosity change. |
| 5 | 4 | $CO_2$ (Dry Ice); acetic acid; water; isopropanol | COOH | 0.36 | 11,000 | 0.58 | 0 |  |
| 6 | 6 | $CO_2$ (gas); HCl; water, isopropanol | COOH | 0.15 | 3,000 |  | 0 |  |
| 7 | 7 | $CO_2$ (Dry Ice); HCl; water, solvent evaporated | COOH | 0.53 | 21,000 | 0.23 | 0 |  |
| 8 | 8 | ---do--- | COOH | 0.32 | 9,400 | 0.58 | 0 |  |
| 9 | 9 | ---do--- | COOH | 0.23 | 6,000 | 0.76 | 0 |  |
| 10 | 10 | ---do--- | COOH | 0.17 | 3,000 | 1.85 | 0 |  |
| 11 | 11 | ---do--- | COOH | 0.52 | 20,000 | 0.63 | 0 |  |
| 12 | 12 | ---do--- | COOH | 0.18 | 4,000 | 1.09 | 0 |  |
| 13 | 13 | $CO_2$ (Dry Ice); HCl; water; isopropanol | COOH | 1.15 | 72,000 | 0.16 | 0 | Refractive Index=1.5140. Ash, wt. percent=0.05. Vinyl, percent=44.9. trans, percent=34.2. |
| 14 | 14 | $CO_2$ (Dry Ice); HCl; water; solvent evaporated | COOH | 0.16 | 3,000 | 0.96 | 0 |  |
| 15 | 15 | ---do--- | COOH | 0.13 | 2,500 | 1.47 | 0 |  |
| 16 | 16 | ---do--- | COOH | 0.15 | 3,000 | 1.28 | 0 |  |
| 17 | 17 | ---do--- | COOH | 0.11 | 2,500 | 1.68 | 0 |  |
| 18 | 18 | ---do--- | COOH | 0.22 | 5,100 | 1.59 | 0 |  |
| 19 | 19 | ---do--- | COOH | 0.42 | 15,000 | 0.16 | 0 |  |
| 20 | 20 | ---do--- | COOH | 1.73 | 150,000 | 0.10 | 0 |  |
| 21 | 21 | ---do--- | COOH | 0.33 | 12,000 | 0.39 | 0 |  |
| 22 | 22 | ---do--- | COOH | 0.19 | 4,000 | 1.22 | 0 |  |
| 23 | 23 | ---do--- | COOH | 0.30 | 8,500 | 0.33 | 0 |  |
| 24 | 24 | ---do--- | COOH | 0.25 | 6,000 | 0.42 | 0 |  |
| 25 | 25 | ---do--- | COOH | 0.37 | 11,000 | 0.39 | 0 |  |
| 26 | 26 | ---do--- | COOH | 0.21 | 5,000 | 0.71 | 0 |  |
| 27 | 27 | ---do--- | COOH | 0.23 |  | 0.24 | 0 |  |
| 28 | 28 | ---do--- | COOH | 0.14 |  | 0.44 | 0 |  |
| 29 | 29 | ---do--- | COOH | 0.48 | 18,000 | 0.08 | 0 |  |
| 30 | 30 | ---do--- | COOH | 0.30 | 9,000 | 0.10 | 0 |  |
| 31 | 31 | ---do--- | COOH | 0.24 |  | 0.03 | 0 |  |
| 32 | 32 | ---do--- | COOH | 0.20 |  | 0.08 | 0 |  |
| 33 | 33 | ---do--- | COOH | 0.22 | 5,000 | 0.10 | 0 |  |
| 34 | 34 | ---do--- | COOH | 0.22 | 5,100 | 0.94 | 0 |  |
| 35 | 35 | ---do--- | COOH | 0.25 | 6,000 | 0.99 | 0 |  |

Table IV
COUPLING AND/OR CURING OF POLYMERS FROM TABLES II AND III

| Run No. | Polymer from Table | Polymer from Run No. | Treatment | Inh. visc. | Approx. mol. wt. | Gel, percent | Swelling index | Remarks |
|---|---|---|---|---|---|---|---|---|
| 1 | III | 1a | Heated at 150° C., 3 hours | 0.96 | [1] 55,000 | 11 | | Analysis of heated polymer from Run 1c gave 1.58 wt. percent sulfur. This value is equivalent to 4.9 moles sulfur in the polymer or 62 wt. percent of the added sulfur remained in the polymer. The polymers containing terminal mercapto groups react when heated to form tough, highly crosslinked products. |
| | III | 1b | ___do___ | 0.51 | [1] 19,600 | 55 | 6.6 | |
| | III | 1c | ___do___ | [2] | | 71 | 7.2 | |
| 2 | III | 2 | Heated at 300° F. (149° C.), 2 hours | 0.92 | 51,900 | 17 | | |
| 3 | II | 3 | α, α'-dichloro-p-xylene: | | | | | Coupling occurred in both runs as evidenced by inherent viscosity increase. |
| | | | a. 10 mmoles/100 g. monomer | 0.74 | 60,000 | 0 | | |
| | | | b. 20 mmoles/100 g. monomer | 0.76 | 38,000 | 0 | | |
| 4 | II | 3 | Tolylene-2,4-diisocyanate: | | | | | Products resembled vulcanized elastomers; initial reaction was followed by crosslinking. |
| | | | a. 10 mmoles/100 g. monomer | | | 64 | 22 | |
| | | | b. 20 mmoles/100 g. monomer | | | 71 | 25 | |
| 5 | III | 5 | Tolylene-2,4-diisocyanate added to COOH-containing polymer; mixture warmed gently for 20 minutes on electric hot plate. | | | | | Polymer cured; changed to a firm solid. |
| 6 | III | 6 | Epon 563 (aliphatic diepoxide resin) | 0.25 | 6,000 | 0 | | Polymer containing carboxy end groups was coupled by each of the reagents as evidenced by increase in molecular weight. |
| | | | Tolylene-2,4-diisocyanate | 0.43 | 15,100 | 0 | | |

[1] Soluble portion.
[2] Not measured.

The following properties which were used in the preceding tables were obtained as follows:

$V_r$ is a reciprocal swelling ratio and is the volume fraction of rubber in the swollen stock, the pigment volume (carbon black, fillers) being subtracted, i.e., $$V_r = \frac{\text{Volume of polymer}}{\text{Volume of polymer} + \text{volume of solvent}}$$

The $V_r$ determination was made by cutting samples of the vulcanized rubber weighing approximately 1.5 grams from regular tensile slabs, weighing them on an analytical balance, and allowing them to swell in n-heptane for six days at 30° C. The swollen specimens were blotted with filter paper and transferred quickly to tared weighting bottles. The volume of imbibed solvent was obtained by dividing the difference between the weight of the swollen sample and the weight of the dry, extracted sample (dried 16 hours at 70° C. in vacuo) by the density of the solvent. Next the dry samples were weighed in methanol and their volume calculated. From this volume was subtracted the volume of fillers (calculated from the recipe and original sample weight) giving the volume of rubber. The latter was used to calculate the volume fraction of rubber in the swollen polymer ($V_r$). This method is described in Rubber World, 135, No. 1, 67–73 (1956).

Resilience was determined using a Yerzley oscillograph. The method is ASTM D945–55.

Heat build-up ($\Delta T$, ° F.) was determined using a Goodrich flexometer. The results are expressed in degrees F. The method is ASTM D623–52T, Method A; 143 p.s.i. load, 0.175-inch stroke, 100° F. oven. $\Delta T$=rise in temperature above 100° F. oven in 15 minutes.

Inherent viscosity was determined as follows: One tenth gram of polymer was placed in a wire cage made from 80 mesh screen and the cage was placed in 100 ml. of toluene contained in a wide-mouth 4-ounce bottle. After standing at room temperature (approximately 25° C.) for 24 hours, the cage was removed and the solution was filtered through a C porosity sulfur absorption tube to remove any solid particles present. The resulting solution was run through a Medalia viscometer in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample. In instances where the polymer was of low molecular weight (inherent viscosity below 0.5), a 0.3 gram sample was used for the determination instead of 0.1 gram.

Determination of the swelling index is made along with the inherent viscosity determination. The wire cage is calibrated for toluene retention in order to correct the weight of swelled gel and to determine accurately the weight of the dry gel. The empty cage is immersed in toluene and then allowed to drain three minutes in a closed wide-mouth, two-ounce bottle. A piece of folded quarter-inch hardware cloth in the bottom of this bottle supports the cage with minimum contact. The bottle containing the cage is weighed to the nearest 0.02 gram during a minimum three-minute draining period after which the cage is withdrawn and the bottle is again weighed to the nearest 0.02 gram. The difference in the two weighings gives the weight of the cage plus the toluene retained by it, and by subtracting the weight of the empty cage from this value, the weight of toluene retention is found, i.e., the cage calibration. In the swelling index determination, after the cage containing the sample has stood for at least 24 hours in toluene, the cage is withdrawn from the bottle with the aid of forceps and placed in the two-ounce bottle. The same procedure is followed for determining the weight of swelled gel as was used for calibration of the cage. The weight of the swelled gel is corrected by subtracting the cage calibration.

The cage, after removal from the two-ounce bottle, is placed in an aluminum weighing dish of known weight and the cage and dish are placed in a vacuum drying oven at 70–80° C. for one hour after which they are allowed to cool to room temperature and weighed. Subtracting the sum of the weights of the aluminum dish and the cage from the latter weighing gives the weight of the gel which is finally corrected for solution retention on the cage and for soluble polymer remaining within the gel structure. Swelling index is calculated by dividing the weight of swelled gel by the weight of dry gel.

The molecular weights given are approximate values. They were calculated according to the method of Scott et al., J. Am. Chem. Soc. 71, 220–223 (1949), using the formula $$[\eta] = KM^a$$

wherein the value used for K was $11.0 \times 10^{-4}$ (value given in the article for sodium polymerized polybutadiene), $a$ was 0.62, and $[\eta]$ was the intrinsic viscosity.

The percent vinyl polymer represents the amount of polymerization which took place by 1,2 addition. When polymerization takes place by 1,4 addition, both cis and trans polymers are formed. The values for vinyl and trans given in Run 13 of Table III were determined by infrared analysis.

Having thus described the invention by providing specific examples thereof it is to be understood that no undue limitations or restrictions are to be drawn by reason thereof and that many variations and modifications are within the scope of the invention.

We claim:

1. A process for making a terminally reactive polymer which comprises contacting a monomer system comprising at least one polymerizable vinylidene compound selected from the group consisting of conjugated dienes and aryl-substituted olefins with from about 0.25 to 100 millimoles per 100 grams of monomer of an organo polylithium polymerization initiator having the formula $RLi_n$ wherein $n$ is an integer of 2 to 4 and R is a hydrocarbon radical selected from the group consisting of aliphatic, cycloaliphatic and aromatic radicals under polymerization conditions including a temperature in the range of —100 to 150° C. and in the presence of predominantly hydrocarbon diluent to form a polymer containing terminal lithium atoms and having a molecular weight of at least 1000, and treating said lithium-containing polymer with a reagent selected from the group consisting of sulfur, halogen, sulfuryl chloride, carbon disulfide, oxygen, carbon dioxide and carbonyl chloride, said contacting of monomer and said treating with reagent being carried out in the substantial absence of hydrolysis agent supplying hydrogen ions and said reagent being reactive with said lithium atoms in the polymer to introduce therefor a group which upon replacement of any lithium atom present in the polymer with a hydrogen atom is selected from the group of functional groups consisting of

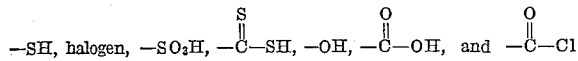

2. The process of claim 1 in which the polymer is a polymer of butadiene, and said reagent is carbon dioxide, said functional group being a carboxy group.

3. The process of claim 1 in which the polymer is a polymer of butadiene, and said reagent is oxygen, said functional group being a hydroxy group.

4. The process of claim 1 in which the polymer is a polymer of butadiene, and said reagent is sulfur, said functional group being a mercapto group.

5. The process of claim 1 in which the polymer is a polymer of styrene, and said reagent is carbon dioxide, said functional group being a carboxy group.

6. The process of claim 1 in which the polymer is a polymer of butadiene, and said reagent is carbonyl chloride, said functional group being

7. The process of claim 1 in which the polymer is a polymer of butadiene, and said reagent is chlorine, said functional group being a chlorine atom.

8. The process of claim 1 wherein more than one monomer are used in the polymerization to form a block copolymer.

9. A process for making a terminally reactive polymer which comprises contacting a monomer system comprising at least one polymerizable vinylidene compound selected from the group consisting of conjugated dienes and aryl-substituted olefins with from about 0.25 to 100 millimoles per 100 grams of monomer of an organo polylithium polymerization initiator having the formula $RLi_n$ wherein $n$ is an integer of 2 to 4 and R is a hydrocarbon radical selected from the group consisting of aliphatic, cyclo-aliphatic and aromatic radicals under polymerization conditions including a temperature in the range of —100 to 150° C. and in the presence of predominantly hydrocarbon diluent to form a polymer containing terminal lithium atoms and having a molecular weight of at least 1000, and treating said lithium-containing polymer with sulfur dioxide and then with a hydrolysis agent to remove the lithium atoms and replace same with hydrogen atoms, said contacting of monomer and said treating with sulfur dioxide being carried out in the substantial absence of hydrolysis agent supplying hydrogen ions.

10. A process for making a terminally reactive polymer which comprises contacting a monomer system comprising at least one polymerizable vinylidene compound selected from the group consisting of conjugated dienes and aryl-substituted olefins with from about 0.25 to 100 millimoles per 100 grams of monomer of an organo polylithium polymerization initiator having the formula $RLi_n$ wherein $n$ is an integer of 2 to 4 and R is a hydrocarbon radical selected from the group consisting of aliphatic, cyclo-aliphatic and aromatic radicals under polymerization conditions including a temperature in the range of —100 to 150° C. and in the presence of predominantly hydrocarbon diluent to form a polymer containing terminal lithium atoms and having a molecular weight of at least 1000, and treating said lithium-containing polymer with a reagent selected from the group consisting of nitriles, isocyanides, isocyanates and isothiocyanates and then with a hydrolysis agent to replace said lithium atoms with hydrogen atoms, said contacting of monomer and said treating with reagent being carried out in the substantial absence of hydrolysis agent supplying hydrogen ions.

11. A process for making a terminally reactive polymer which comprises contacting a monomer system comprising at least one conjugated diene having 4 to 8 carbon atoms per molecule with an organo polylithium polymerization initiator having a formula $RLi_n$ wherein $n$ is an integer of 2 to 4 and R is a hydrocarbon radical selected from the group consisting of aliphatic, cycloaliphatic and aromatic radicals under polymerization conditions and in the presence of predominantly hydrocarbon diluent to form a polymer containing terminal lithium atoms, said polymer having a molecular weight in the range of 1000 to 150,000, and reacting said polymer with halogen to replace said lithium atoms with halogen atoms, said contacting of monomer and reacting with halogen being carried out in the substantial absence of hydrolysis agent supplying hydrogen ions.

12. A process for making a terminally reactive polymer which comprises contacting a monomer system comprising at least one conjugated diene having 4 to 8 carbon atoms per molecule with an organo polylithium polymerization initiator having a formula $RLi_n$ wherein $n$ is an integer of 2 to 4 and R is a hydrocarbon radical selected from the group consisting of aliphatic, cycloaliphatic and aromatic radicals under polymerization conditions and in the presence of predominantly hydrocarbon diluent to form a polymer containing terminal lithium atoms, said polymer having a molecular weight in the range of 1000 to 150,000, and reacting said polymer with carbon dioxide and then $H^+$ ions to replace said lithium atoms with carboxy groups, said contacting of monomer and reacting with carbon dioxide being carried out in the substantial absence of hydrolysis agent supplying hydrogen ions.

13. A process for making a self curing terminally reactive polymer with comprises contacting a monomer system comprising at least one conjugated diene having 4 to 8 carbon atoms per molecule with an organo polylithium polymerization initiator having a formula $RLi_n$ wherein $n$ is an integer of 2 to 4 and R is a hydrocarbon radical selected from the group consisting of aliphatic, cycloaliphatic and aromatic radicals under polymerization conditions and in the presence of predominantly hydrocarbon diluent to form a polymer containing terminal lithium atoms, said polymer having a molecular weight in the range of 1000 to 150,000, and reacting said polymer with sulfur and then H+ ions to replace said lithium atoms with mercapto groups, said contacting of monomer and reacting with sulfur being carried out in the substantial absence of hydrolysis agents supplying hydrogen ions.

14. A process for making a polymeric material which comprises contacting a monomer system comprising at least one conjugated diene having from 4 to 8 carbon atoms per molecule with an organo polylithium polymerization initiator having the formula $RLi_n$ wherein $n$ is an integer of 2 to 4 and R is a hydrocarbon radical selected from the group consisting of aliphatic, cycloaliphatic and aromatic radicals under polymerization conditions in the presence of predominantly hydrocarbon diluent to form a polymer containing terminal lithium atoms, treating said polymer with sulfur and then with H+ ions thereby removing lithium atoms and replacing same with mercapto groups, and curing the resulting polymer at a temperature in the range of 100 to 500° F.

15. The process of claim 14 in which said curing is carried out in the presence of a conventional polymer curing system selected from the group consisting of sulfur curatives and peroxide.

16. A process for making a polymeric material which comprises contacting a monomer system comprising at least one conjugated diene having from 4 to 8 carbon atoms per molecule with an organo polylithium polymerization initiator having the formula $RLi_n$ wherein $n$ is an integer of 2 to 4 and R is a hydrocarbon radical selected from the group consisting of aliphatic, cycloaliphatic and aromatic radicals under polymerization conditions in the presence of predominantly hydrocarbon diluent to form a polymer containing terminal lithium atoms, treating said polymer with sulfuryl chloride and then with H+ ions thereby removing lithium atoms and replacing same with $-SO_3H$ groups, and curing the resulting polymer at a temperature in the range of 100 to 500° F.

17. A process for making a polymeric material which comprises contacting a monomer system comprising at least one conjugated diene having from 4 to 8 carbon atoms per molecule with an organo polylithium polymerization initiator having the formula $RLi_n$ wherein $n$ is an integer of 2 to 4 and R is a hydrocarbon radical selected from the group consisting of aliphatic, cycloaliphatic and aromatic radicals under polymerization conditions in the presence of predominantly hydrocarbon diluent to form a polymer containing terminal lithium atoms, treating said polymer with carbon disulfide and then with H+ ions thereby removing lithium atoms and replacing same with

groups, and curing the resulting polymer at a temperature in the range of 100 to 500° F.

18. A process for the preparation of solid polymer which comprises polymerizing butadiene in the presence of 1,4-dilithiobutane contacting the resulting polymer with sulfur and then with H+ ions, thereby removing lithium atoms in the polymer and replacing same with mercapto groups, and thereafter reacting molecules of said polymer by heating at a temperature in the range of 100 to 500° F.

19. A process for making a polymeric material which comprises contacting a monomer system comprising at least one conjugated diene having from 4 to 8 carbon atoms per molecule with an organo polylithium polymerization initiator having the formula $RLi_n$ wherein $n$ is an integer of 2 to 4 and R is a hydrocarbon radical selected from the group consisting of aliphatic, cycloaliphatic and aromatic radicals under polymerization conditions in the presence of predominantly hydrocarbon diluent to form a polymer containing terminal lithium atoms, and reacting said polymer with not over a stoichiometric amount of a polyfunctional organic compound having the formula $R'Y_x$ wherein $R'$ is selected from the group consisting of aliphatic, cycloaliphatic and aromatic radicals, $x$ is at least 2, and Y is a functional group capable of reacting with said lithium atoms and characterizing said compound as one of the materials selected from the group consisting of acid anhydrides, halides, amines, ketones, isocyanates, and epoxy compounds, whereby at least two polymer molecules are coupled to said polyfunctional organic compound to form polymers of higher molecular weight; said contacting of monomer and said reacting with polyfunctional organic compound being carried out in the substantial absence of hydrolysis agent supplying hydrogen ions.

20. The process of claim 19 in which said polymer is a polymer of butadiene containing terminal lithium atoms and the polyfunctional organic compound is tolylene-2,4-diisocyanate.

21. A process for making a polymeric material which comprises contacting a monomer system comprising at least one polymerizable vinylidene compound selected from the group consisting of conjugated dienes and aryl-substituted olefins with an organo polylithium polymerization initiator having he formula $RLi_n$ wherein $n$ is an integer of 2 to 4 and R is a hydrocarbon radical selected from the group consisting of aliphatic, cycloaliphatic and aromatic radicals under polymerization conditions and in the presence of predominantly hydrocarbon diluent to form a polymer containing terminal lithium atoms, treating said lithium-containing polymer with a reagent selected from the group consisting of sulfur, halogen, sulfuryl chloride, carbon disulfide, oxygen, carbon dioxide and carbonyl chloride, said contacting of monomer and said treating with reagent being carried out in the substantial absence of hydrolysis agent supplying hydrogen ions and said reagent being reactive with said lithium atoms in the polymer to introduce therefor a group which upon replacement of any lithium atom present in the polymer with a hydrogen atom is selected from the group of functional groups consisting of $$-SH, \text{halogen}, -SO_3H, -\overset{S}{\underset{\|}{C}}-SH, -OH, -\overset{O}{\underset{\|}{C}}-OH, \text{ and } -\overset{O}{\underset{\|}{C}}-Cl$$

removing any remaining lithium atoms from the polymer by hydrolysis, and thereafter reacting the resulting terminally reactive polymer containing functional groups with a polyfunctional organic compound having the formula $R''Y_x$ wherein $R''$ is selected from the group consisting of aliphatic, cycloaliphatic, and aromatic radicals, $x$ is at least 2, and Y is a functional radical reactive with the functional groups in said terminally reactive polymer and characterizing said polyfunctional organic compound as a compound selected from the group consisting of alcohols, acids, acid anhydrides, halides, amines, ketones, isocyanates, and epoxy compounds.

22. The process of claim 21 in which reaction of the terminally reactive polymer is carried out in the presence of a conventional polymer curing system selected from the groups consisting of sulfur curatives and peroxides.

23. The process of claim 21 wherein said reagent is carbon dioxide, and said functional group is a carboxy group.

24. A process for making polymeric material which comprises contacting butadiene with 1,4-dilithiobutane under polymerization conditions and in the presence of predominantly hydrocarbon diluent to form a polymer containing terminal lithium atoms, treating said polymer with carbon dioxide and then with H+ ions thereby removing lithium atoms and replacing same with carboxy groups, and reacting the thus formed polymer with tolylene-2,4-diisocyanate.

25. A process for making polymeric material which comprises contacting butadiene with 1,2-dilithio-1,2-diphenylethane under polymerization conditions and in the presence of predominantly hydrocarbon diluent to form a polymer containing terminal lithium atoms, treating said polymer with carbon dioxide and then with H+ ions thereby removing lithium atoms and replacing same with carboxy groups, and reacting the thus formed polymer with tolylene-2,4-diisocyanate.

26. A process for making polymeric material which comprises contacting butadiene with 1,2-dilithio-1,2-diphenylethane under polymerization conditions and in the presence of predominantly hydrocarbon diluent to form a polymer containing terminal lithium atoms, treating said polymer with carbon dioxide and then with $H^+$ ions thereby removing lithium atoms and replacing same with carboxy groups and reacting the thus formed polymer with aliphatic diepoxide resin.

References Cited in the file of this patent

UNITED STATES PATENTS

| | | |
|---|---|---|
| 2,146,447 | Scott | Feb. 7, 1939 |
| 2,352,461 | Walker | June 27, 1944 |
| 2,647,146 | Arthur | July 28, 1953 |
| 2,813,776 | Koller | Nov. 19, 1957 |
| 2,843,577 | Friedlander et al. | July 15, 1958 |
| 2,850,539 | Schott et al. | Sept. 2, 1958 |
| 2,850,540 | Frank et al. | Sept. 2, 1958 |
| 2,867,656 | Robinson et al. | Jan. 6, 1959 |
| 2,877,212 | Seligman | Mar. 10, 1959 |
| 3,031,432 | Kern | Apr. 24, 1962 |
| 3,055,952 | Goldberg | Sept. 25, 1962 |
| 3,070,579 | Szwarc | Dec. 25, 1962 |

FOREIGN PATENTS

| | | |
|---|---|---|
| 559,704 | Italy | Mar. 23, 1957 |
| 561,529 | Italy | Apr. 23, 1957 |

OTHER REFERENCES

Rubber Chem. & Tech., K. Ziegler, vol. 11, 1938, pp. 505–506 relied on.